United States Patent [19]
Montemayor et al.

[11] Patent Number: 6,063,517
[45] Date of Patent: *May 16, 2000

[54] SPIRAL WRAPPED CYLINDRICAL PROTON EXCHANGE MEMBRANE FUEL CELLS AND METHODS OF MAKING SAME

[75] Inventors: Alan Montemayor; Edward Albert Bass; Michael Stewart; Narasi Sridhar, all of San Antonio, Tex.

[73] Assignee: Southwest Research Institute, San Antonio, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/951,400

[22] Filed: Oct. 16, 1997

[51] Int. Cl.[7] .................................................. H01M 8/10
[52] U.S. Cl. ............................... 429/31; 429/30; 429/35; 429/39; 429/40; 429/41
[58] Field of Search ................................. 429/31, 35, 39, 429/40, 41

[56] References Cited

U.S. PATENT DOCUMENTS

| | | |
|---|---|---|
| 2,864,130 | 12/1958 | Beare . |
| 3,291,753 | 12/1966 | Thompson et al. . |
| 3,413,152 | 11/1968 | Folkins et al. . |
| 3,423,247 | 1/1969 | Darland, Jr. et al. . |
| 3,460,991 | 8/1969 | White, Jr. et al. . |
| 4,022,949 | 5/1977 | Nabiullin . |
| 4,288,058 | 9/1981 | Inman . |
| 4,490,444 | 12/1984 | Isenberg . |
| 4,551,220 | 11/1985 | Oda et al. . |
| 4,562,124 | 12/1985 | Ruka . |
| 4,597,170 | 7/1986 | Isenberg . |
| 5,037,525 | 8/1991 | Badwal . |
| 5,106,706 | 4/1992 | Singh et al. . |
| 5,151,334 | 9/1992 | Fushimi et al. . |
| 5,336,570 | 8/1994 | Dodge, Jr. ................................. 429/31 |
| 5,458,989 | 10/1995 | Dodge ..................................... 429/31 |
| 5,492,778 | 2/1996 | Akagi . |
| 5,509,942 | 4/1996 | Dodge ................................. 29/623.2 |

OTHER PUBLICATIONS

S. Mukerjee, et al., "Effect of Sputtered Film of Platinum on Low Platinum Loading Electrodes on Electrode Kinetics of Oxygen Reduction in Proton Exchange Membrane Fuel Cells", Electrochemical Acta V. 38, No. 12 pp. 1661–1669 (1993).

E.J. Taylor, et al., "Preparation of High–Platinum–Utilization Gas Diffusion Electrodes for Proton–Exchange–Membrane Fuel Cells", Electrochemical Society Letters V. 139, No. 5 pp. L45–46 (May 1992).

NAFION, "Heat Sealing Machine", Technical Information Bulletin 91–01 (Feb. 1991).

NAFION, "Heat Seal Repair of NAFION Membrane", Technical Information Bulletin 91–02.

NAFION, "Perfluorosulfonic Acid Membrane", Product Bulletin.

E.A. Ticianelli, et al., "Methods to Advance Technology of Proton Exchange Membrane Fuel Cells", J. Electrochemical Society V. 135, No. 9 pp. 2209–2214 (Sep. 1988).

*Primary Examiner*—Maria Nuzzolillo
*Assistant Examiner*—Angela J. Martin
*Attorney, Agent, or Firm*—Paula D. Morris & Associates P.C.

[57] ABSTRACT

A pre-spiral bundle for making a spiral wrapped cylindrical fuel cell and cylindrical fuel cells made using the pre-spiral bundle. The pre-spiral bundle comprises a sleeve defining a hydrogen flowpath. The sleeve comprises a proton exchange membrane encapsulating a substantially planar anode in ionic communication with a catalytically effective amount of a noble metal catalyst. A first hydrogen inlet comprises a first edge of the sleeve and a second hydrogen inlet comprises an opposed, substantially parallel edge of the sleeve. The hydrogen flowpath is defined by the anode. A cylindrical fuel cell is made by abutting a flexible, porous cathode to the sleeve in ionic communication with a noble metal catalyst and wrapping the sleeve and the cathode around one of the hydrogen inlets.

25 Claims, 4 Drawing Sheets

SPIRAL WRAPPED CYLINDRICAL PROTON EXCHANGE MEMBRANE FUEL CELLS AND METHODS OF MAKING SAME

FIELD OF THE INVENTION

The present invention relates to a pre-spiral bundle and to a spiral wrapped cylindrical proton exchange membrane fuel cell made using the pre-spiral bundle.

BACKGROUND OF THE INVENTION

Fuel cells combine hydrogen and oxygen without combustion to form water and to produce direct current electric power. The process can be described as electrolysis in reverse. Fuel cells have been pursued as a source of power for transportation because of their high energy efficiency (unmatched by heat engine cycles), their potential for fuel flexibility, and their extremely low emissions. Fuel cells have potential for stationary and vehicular power applications; however, the commercial viability of fuel cells for power generation in stationary and transportation applications depends upon solving a number of manufacturing, cost, and durability problems.

The most promising fuel cells for widespread transportation use are Proton Exchange Membrane (PEM) fuel cells. PEM fuel cells operate at low temperatures, produce fast transient response, and have relatively high energy density compared to other fuel cell technologies. Any fuel cell design must: (a) allow for supply of the reactants (typically hydrogen and oxygen); (b) allow for mass transport of product (water) and inert gases (nitrogen and carbon dioxide from air), and (c) provide electrodes to support catalyst, collect electrical charge, and dissipate heat. Electrical and thermal resistance, reactant pressures, temperatures, surface area, catalyst availability, and geometry are the main factors affecting the performance and efficiency of a fuel cell.

One problem encountered in dealing with PEM fuel cells is the need to reduce thermal and mechanical stress concentrations and to increase integrity and performance of the fuel cell. Current phosphoric acid and PEM fuel cells rely on flat-plate electrodes. Flat plate PEM fuel cells suffer from reactant flow distribution problems which can cause inefficient operation and even premature failure of the fuel cell. The use of tubular, or capillary PEM fuel cells could lead to lower thermal stress and reduced manufacturing costs.

One problem with both flat plate and cylindrical fuel cells is power loss due to the resistance of the electrode and electrolyte, which increases with the required size of the fuel cell. A PEM fuel cell with a spiral wrapped configuration would minimize electrical resistance losses, while permitting scale-up of the fuel cell to larger sizes without unduly increasing the resistance of the electrode and electrolyte. A spiral wrapped fuel cell could be increased in size simply by adding more spiral wraps without unduly increasing the distance over which the electrical current must be collected.

Simple methods are needed to manufacture spiral wrapped PEM fuel cells, contained in a cylindrical chamber.

SUMMARY OF THE INVENTION

The present invention provides a pre-spiral bundle for making a spiral wrapped cylindrical fuel cell. The pre-spiral bundle comprises a sleeve defining a hydrogen flowpath. The sleeve comprises a proton exchange membrane encapsulating a substantially planar anode in ionic communication with a catalytically effective amount of a noble metal catalyst. A first hydrogen inlet comprises a first edge of the sleeve and a second hydrogen inlet comprises an opposed, substantially parallel edge of the sleeve. The hydrogen flowpath is defined by the anode.

DETAILED DESCRIPTION OF THE INVENTION

The materials used to construct the fuel cell of the present invention should resist corrosion in an acid environment, offer good electrical conductivity, allow fast permeation of oxygen (cathode) and hydrogen (anode), and contribute little to the weight and cost of the fuel cell assembly. Suitable materials must be sufficiently porous to allow the hydrogen and oxygen to pass through the spiral bundle.

Figure 1:
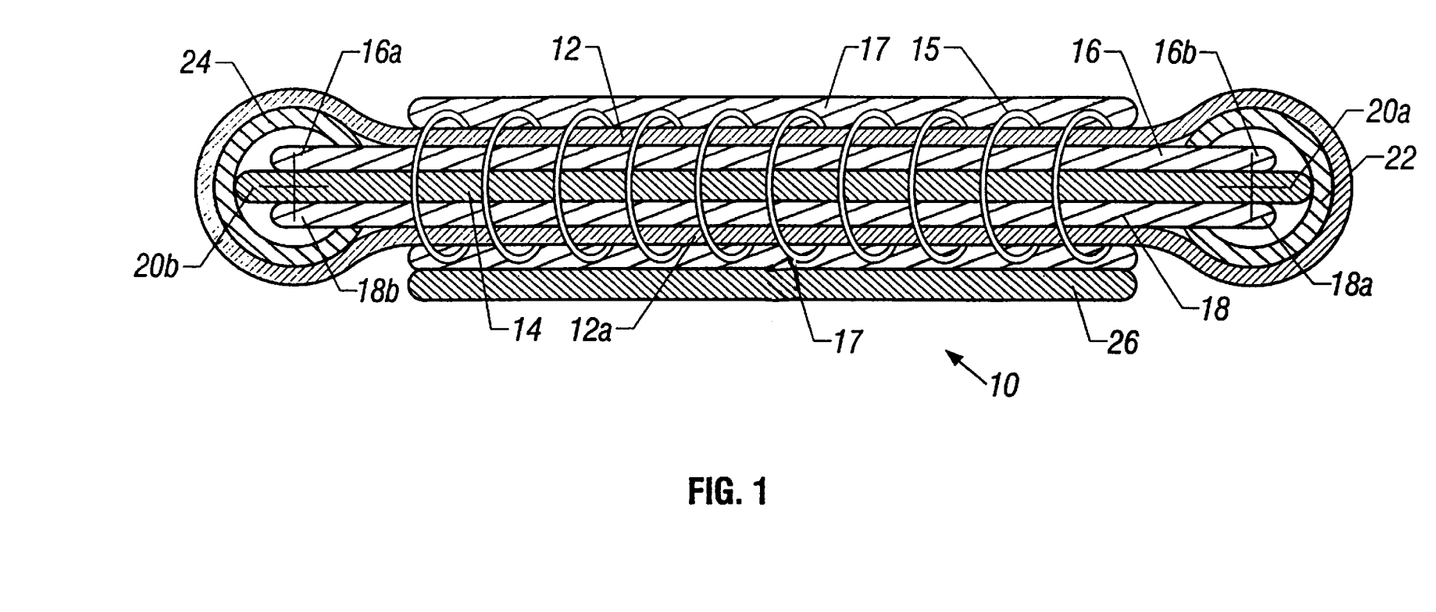
FIG. 1 is a perspective view of an end 13a of the pre-spiral bundle of FIG. 1a wherein the end seal is depicted as a "transparent" spiral 15 to indicate "transparency" for purposes of illustration.
Figure 1A:
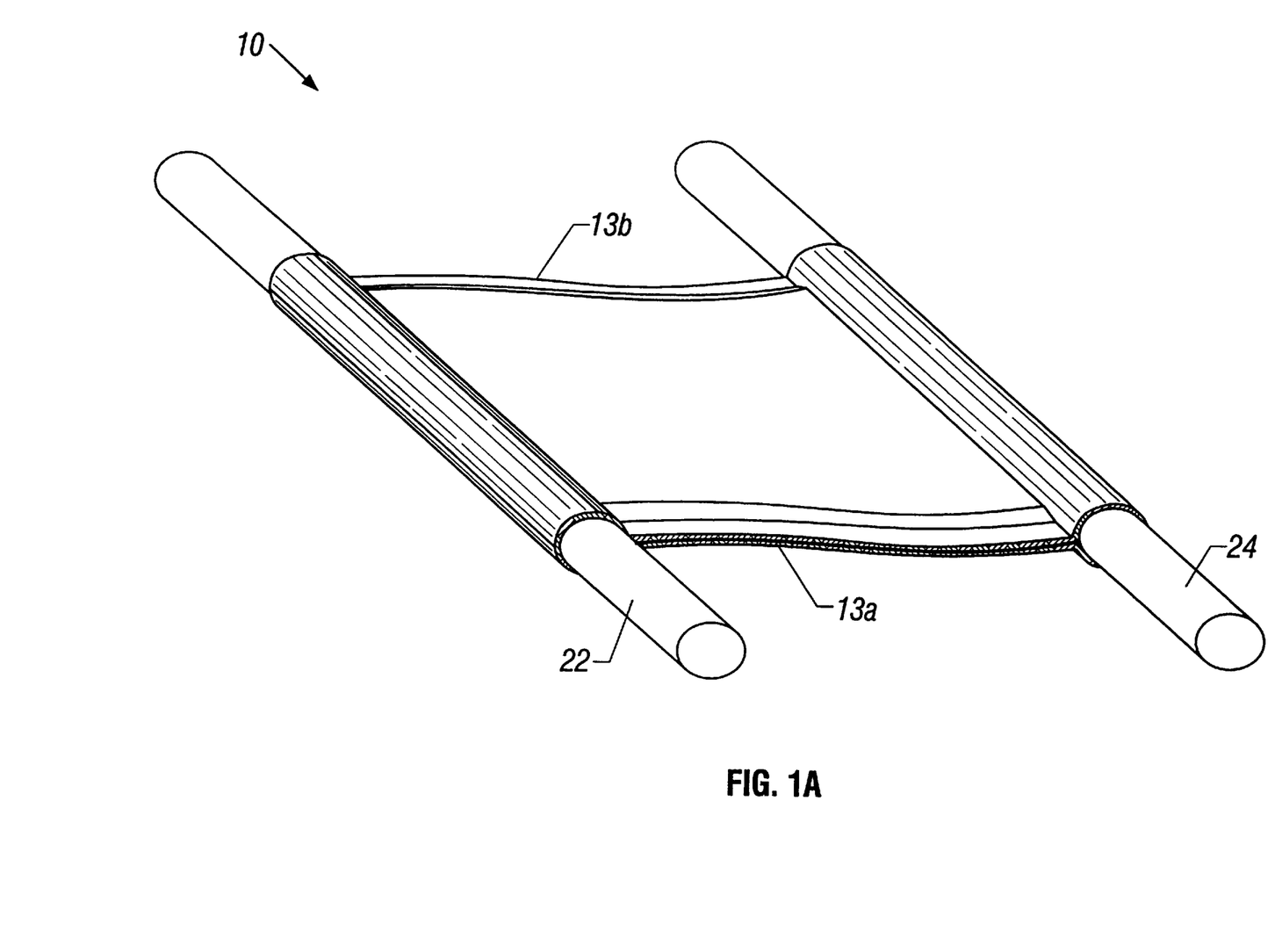
FIG. 1a is a perspective view of the pre-spiral bundle in FIG. 1.
Figure 2:
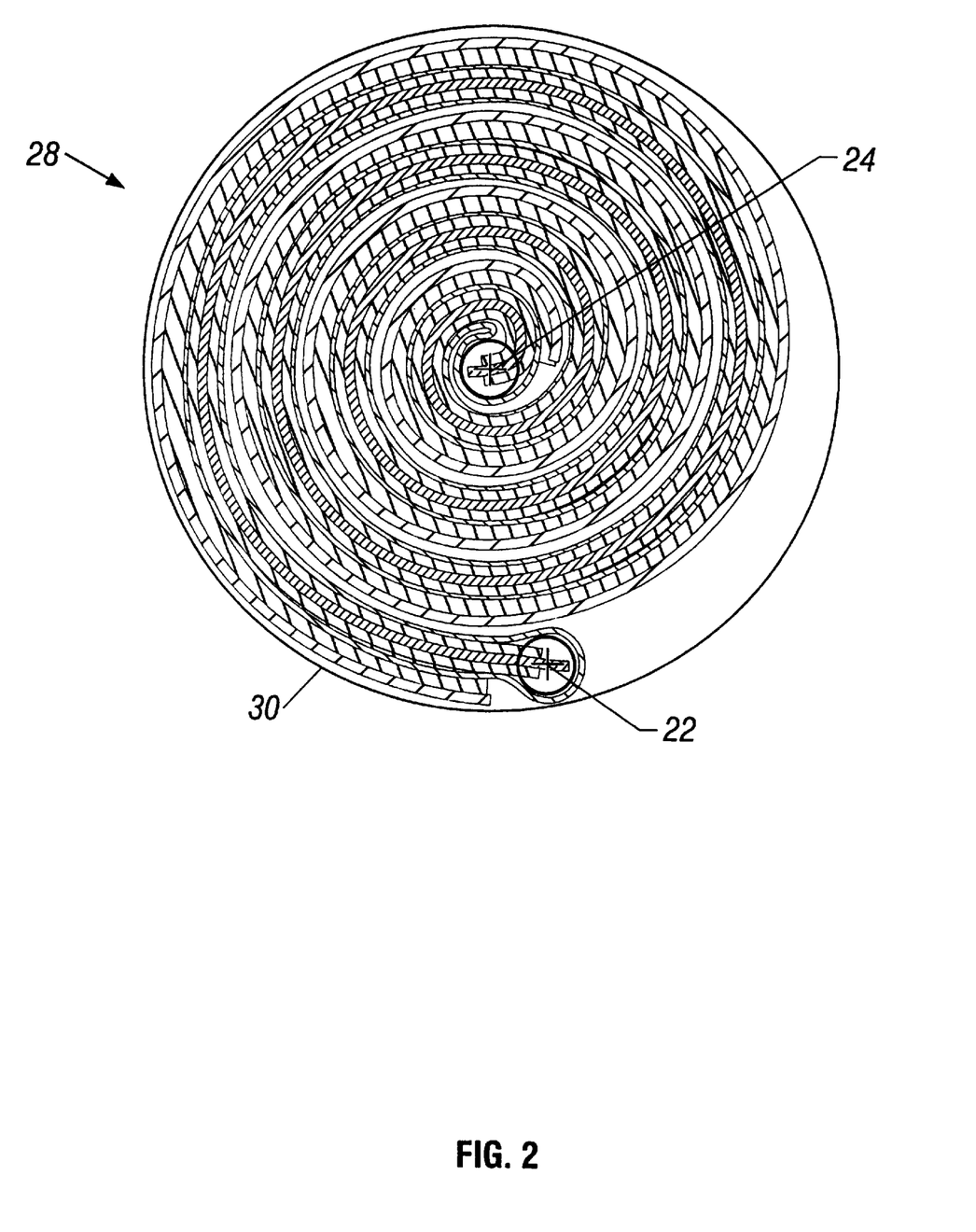
FIG. 2 is a cross-section taken along line 2—2 in FIG. 3.

According to the present invention, a flexible elongated membrane electrode assembly (MEA) is furnished with hydrogen injection tubes 22, 24 at substantially parallel opposed edges to form a pre-spiral bundle 10 (FIG. 1a). A perspective viewing of one end 13a of the pre-spiral bundle 10 is shown in FIG. 1. The pre-spiral bundle 10 of FIGS. 1 and 1a is spirally wrapped using one of the hydrogen injection tubes 22, 24 as a central mandrel, forming a cylindrical spiral bundle 28 (FIG. 2). The spiral bundle 28 is encased in an electrically conductive casing 30 (FIG. 3), which serves simultaneously as an electrical contact, a mechanical containment, a means of maintaining cell compression, and an oxygen supply conduit.

The pre-spiral bundle 10 (FIG. 1) may comprise substantially any membrane electrode assembly (MEA) comprising all of the necessary components which is flexible enough to be wound into a spiral bundle. The anode 14 may comprise substantially any flexible conductive material capable of establishing a linear gaseous flowpath and of being wound spirally into a cylindrical configuration. A preferred material for the anode 14 is corrugated stainless steel. The anode 14 serves as a self-supporting hydrogen flowpath, which abuts inner and outer catalyst layers 16 and 18 (preferably either a carbon support layer on a PRIMEA membrane or a similar membrane, described more fully below, or carbon cloth coated with carbon support material and platinum).

First and second edges of the anode 20a, 20b and, if a separate catalyst support is used, first and second edges of the catalyst support 16a, 18a and 16b, 18b, may extend slightly into hydrogen injection tubes 22, 24, respectively. The hydrogen injection tubes 22, 24 may be made of substantially any relatively rigid material which will not degrade in the fuel cell environment and, if electrically conductive, act as electrodes as well. Preferably, the hydrogen injection tubes 22, 24 are slit tubes made of stainless steel having an inner diameter of sufficient size to inject a sufficient amount of hydrogen at a sufficient pressure to permeate across substantially the entire surface area of the anode after encapsulation by a proton exchange membrane 12 and spiral wrapping, as described below. In a preferred embodiment having dimensions as described herein, the diameter of the hydrogen injection tubes is in the range of from about ³⁄₁₆ inch to about ¼ inch.

Substantially any ionomer may be used as the proton exchange membrane (PEM). A preferred proton exchange membrane comprises a PRIMEA membrane, available from W. L. Gore & Associates, Elkton, Md. The PRIMEA comprises a flat sheet of proton exchange membrane coated on both sides with platinum black catalyst on a carbon support. The edges of the membrane preferably should bear no carbon black or platinum black for a distance sufficient to overlap and heat seal the uncoated edges together. Other suitable membrane materials include, but are not necessarily limited to NAFION 115™, available from Dupont, which either may be coated with a suitable carbon support/catalyst layer or used in conjunction with a separate electrocatalytic layer.

In a preferred embodiment, a PRIMEA catalyst-coated membrane is manufactured as a tubular sleeve 12 large enough to insert the anode 14 with edges 20a, 20b and optionally, separate catalyst layer edges 16a, 18a and 16b, 18b, respectively, inserted into the hydrogen injection tubes 22, 24. The tubular sleeve should form a tight fit around and encapsulate the anode 14 and hydrogen injection tubes 22, 24. The tubular edges adjacent to the hydrogen injection tubes 22, 24 preferably are heat sealed to the hydrogen injection tubes 22, 24.

If the catalyst-coated membrane 12 is not available in tubular form in a desired size, then, in a preferred embodiment, the membrane 12 comprises a single sheet which is wrapped around the assembly comprising the anode 14 and the hydrogen injection tubes 22, 24 and heat sealed at open edges to form an envelope surrounding the assembly. In this embodiment, a first edge of the membrane sheet is aligned with the hydrogen injection tube 22, the sheet is wound to form a relatively tight fit across an upper surface of the anode 14, around the hydrogen injection tube 24 at the second end, across the lower surface of the anode 14, until a second, substantially parallel edge is aligned with the first edge adjacent to the outside of the hydrogen injection tube 22. The first and the second edges, which preferably are not coated with the carbon support and catalyst for ease in heat sealing, are overlapped and heat sealed together along the hydrogen injection tube 22.

In another embodiment, the membrane 12 comprises two sheets of catalyst-coated material, each having first and second edges which are opposed and substantially parallel, and third and fourth edges which are opposed, substantially parallel, and at substantially right angles at the ends of the first and second edges, respectively, forming a substantially rectangular shape. The first, second, third, and fourth edges of both membranes preferably are uncoated with catalyst. The membranes are placed above and below the anode 14/hydrogen injection tube 22, 24 assembly, with first, second, third, and fourth edges of each membrane being aligned. The first edges of each membrane are aligned with hydrogen injection tube 22 and heat sealed together, the second edges are aligned with hydrogen injection tube 24 and heat sealed together, the third edges of each membrane are aligned and heat sealed (to form end 13a), and the fourth edges of each membrane are aligned and heat sealed together (form end 13b). The result is a membrane envelope which is sealed along each edge.

Heat sealing may be accomplished by heating a suitable plated to a temperature near the melting point of the membrane material. If the membrane has a carbon platinum coating, then the area to be sealed should be prepared by removing the coating, preferably by wiping with methanol and drying for at least about 30 seconds. If the membrane has a gasket release agent present, then it should be removed using one of the following techniques:

KRYTOX 105 Perfluorinated Oil—Wipe on FREON 133 (available from DUPONT) cleaning agent and blot dry;

KRYTOX 205 Perfluorinated Grease—Wipe on FREON 113 followed by BH-38 (available from Spartan Chemical, Toledo, Ohio, spray area with water and then blot dry;

Silicone Grease—Wipe on acetone and then blot dry.

Thermal decomposition products of fluoropolymers, such as ionomers, are hazardous from the standpoint of health and safety, and proper precautions, such as adequate exhaust ventilation, should be taken to prevent exposure.

Preferred machines for use in heat sealing are various Vertrod machines (such as Model 1×1 or EB/BS-CAN-WC-VAR) or SENCORP Model 48-TPDW. The membrane should be washed off or soaked in deionized water before heat sealing. At all times before, during, and after heat sealing, the membrane should be wet and evenly supported to prevent "dry handling damage." Only the area to be heat sealed should be blotted dry. The surface needs only to be blotted in the area to be sealed to remove visible water. A very light coating of a silicon grease, such as DOW CORNING #7 or equivalent, should be applied to the jaw surfaces before each heat sealing procedure to aid in jaw release.

As an example, to heat seal a NAFION 117 or 324 membrane, the settings on the heat sealing machine should be: about 316° C. (600° F.) sealing temperature; about 38° C. (100° F.) react temperature; and, about 28 seconds dwell. The exact settings will vary by the size of the machine and the quantity and thickness of the membrane. To heat seal the edges of the membrane envelope together, join the inner surfaces of each edge of the envelope, place the abutting and aligned two edges between the sealing surfaces of the plated, and seal the edges, preferably at a pressure of about 10 kPa (60 psig). After sealing, excess seal surface can be trimmed off.

The membrane should be stored after heat sealing in a deionized water bath unless the membrane was treated with HCl, in which case the membrane should be stored for at least 8 hours in 2% NaOH or $NaHCO_3$ to be reconverted to $Na^+$ form. The membrane may be leak checked after soaking. Care should be taken to avoid contact between any portion of the membrane outside of the actual heat zone and any part of the heating head. If such contact occurs, the contact area may allow heat transfer and the membrane will become distorted, i.e., with wrinkles in a "ripple wave" type pattern.

The heat seal is represented in an end view (FIG. 1) as spiral 15. The cathode 26 is not encapsulated within the sleeve 12. The cathode 26 preferably comprises a porous, electrically conductive material (preferably corrugated stainless steel), which serves as a self-supporting oxygen gas or air flowpath. The cathode 26 (FIG. 1) substantially covers one surface of the PEM 12 between the hydrogen injection tubes 22, 24, preferably the surface of the PEM 12 which will face toward the outside of the spiral bundle 28 (FIG. 2).

Although corrugated stainless steel is a preferred material for the anode 14 and corrugated stainless steel is a preferred material for the cathode 26, other suitable materials, preferably for the anode, include, but are not necessarily limited to graphite, carbon fiber and carbon cloth, and stainless steel cloth.

The catalyst bearing media may be any number of sufficiently porous materials, a preferred material being a commercially doped carbon cloth. Suitable catalysts include noble metal catalysts, such as platinum, gold, silver, palladium, ruthenium, rhodium, and iridium. A preferred catalyst is platinum black on carbon.

A preferred carbon cloth is VULCAN XC-72™, which is available from a number of commercial sources, and comprises in the range of from about 4 to about 5 mg/cm$^2$ carbon black and about 0.4 mg/cm$^2$ platinum black catalyst. The carbon cloth preferably should be treated with a chemical casting of polytetrafluoro ethylene (PTFE) to provide a hydrophobic layer, which prevents water from blocking the active areas of the fuel cell.

As shown in FIG. 1a, the pre-spiral bundle 10 has a height defined by the hydrogen injection tubes 22, 24 and a length defined by ends 13a, 13b. The preferred height and length of the tubular membrane 12 will vary depending upon the equipment used to inject hydrogen into the hydrogen injection tubes 22, 24 and air or oxygen into the bundle along the oxygen flowpath. Using a commercially available air or oxygen blower at a pressure of about 3 atmospheres, a preferred height for the hydrogen injection tubes 22, 24 is about 4 inches. The hydrogen injection tubes 22, 24 may be longer if a more highly pressurized source of air or oxygen gas is used. The length of the tubular membrane 12 along ends 13a, 13b also will differ depending upon the pressure of the hydrogen source. A preferred length is in the range of from about 6 inches to about 24 inches. Since many commercially available hydrogen sources supply about 3 atmospheres of pressure, a most preferred length along ends 13a, 13b is about 18 inches. Knowing the respective pressures of the gas sources, a person of ordinary skill in the art will be able to determine an appropriate height and length for the membrane 12.

Referring to FIG. 2, the entire pre-spiral bundle 10 is wound into a spiral bundle 28 using one of the hydrogen injection tubes 24 as a central mandrel. The other hydrogen injection tube 22 lies along the outside of the spiral bundle 28. The spiral bundle 28 preferably is maintained in a cylindrical configuration by a casing 30. The casing 30 preferably is a stainless steel tube pressurized with air at a pressure in the range of from about 2 inches of water to about 3 atmospheres. Oxygen or air which is forced into the casing 30 flows through the permeable cathode 26 and into the cell in a direction substantially parallel to the axis of the spiral bundle 28, as indicated by arrows 33 (FIG. 3).

Hydrogen 32 is forced into hydrogen injection tubes 22, 24 at each end of the elongated tubular anode 32 in FIG. 4, as indicated by arrows 34, and travels from the tubes 22, 24 along the spiral path defined by the anode 14 in the spiral bundle 28. The hydrogen pressure should be sufficient to force the hydrogen around the spiral path formed by the anode 14 while hydrogen also is escaping radially inward and outward through the catalyst layers 16, 18 to the cathode 26. The protons from the reaction of hydrogen with the hydrogen catalyst layers 16, 18 flow through the proton exchange membrane 12 at both sides of the anode 14 to the oxygen catalyst layer 17 (FIG. 1). The flow of oxygen or air carries away excess water formed at the cathode.

Figure 3:
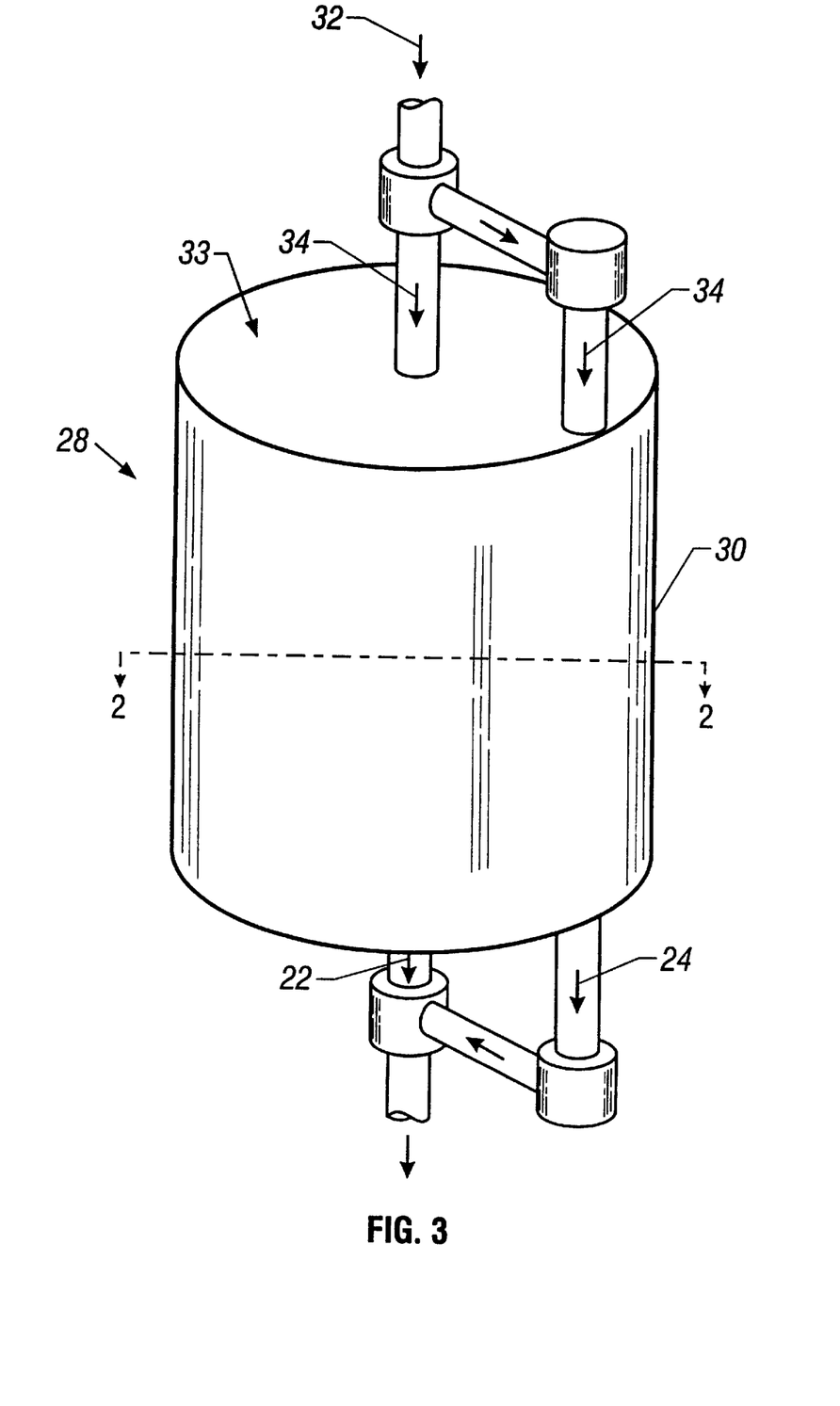
FIG. 3 is a perspective view of the fuel cell of FIG. 1, including an enclosure for pressurization.

Referring to FIG. 3, the hydrogen injection tubes 22, 24 act simultaneously as hydrogen conduits, electrical contacts, and as mechanical supports for winding the pre-spiral bundle 12 into a spiral bundle 28. Substantially any end caps or manifolds with inlets for hydrogen and air or oxygen may be used at the ends of the spiral bundle 28. Also, depending upon the application and the pressure required for the air or oxygen source, it is theoretically possible to use no end caps.

The spiral geometry (1) efficiently packs a large membrane area into a small package, and (2) is self-supporting, with successive wraps containing and providing clamping force for underlying layers. The fuel cell should exhibit open circuit voltage preferably greater than about 0.5 volts, most preferably about 1 volt, and an operational voltage in the range of from about 0.4 volts to about 1.0 volts.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

We claim:

1. A pre-spiral bundle for a cylindrical fuel cell comprising:

an anode having first and second opposed edges and at least one surface in ionic communication with a noble metal catalyst;

a first hydrogen inlet disposed along said first edge of said anode;

a second hydrogen inlet disposed along said second edge of said anode; and a sleeve comprising a proton exchange membrane having upper and lower substantially planar surfaces abutting and encapsulating said anode, said first hydrogen inlet, said second hydrogen inlet, and defining a hydrogen flow path along said anode and between the upper and lower surfaces of said sleeve.

2. The pre-spiral bundle of claim 1 wherein said hydrogen flowpath extends from said first hydrogen inlet toward said second hydrogen inlet and from said second hydrogen inlet toward said first hydrogen inlet.

3. A spirally wrapped cylindrical fuel cell comprising:

a substantially planar anode having first and second opposed edges and at least one surface in ionic communication with a first noble metal catalyst;

a first hydrogen inlet disposed along said first edge of said anode;

a second hydrogen inlet disposed along said second edge of said anode;

a sleeve comprising a proton exchange membrane having upper and lower substantially planar surfaces abutting and encapsulating said anode, said first hydrogen inlet, said second hydrogen inlet, and defining a hydrogen flow path along said anode and between the upper and lower surfaces of said sleeve; and a cathode in fluid communication with a flowpath for a gas comprising oxygen and in ionic communication with said anode and a second noble metal catalyst;

wherein said sleeve and said cathode are spirally wrapped around a mandrel comprising one of said first and second hydrogen inlets.

4. The fuel cell of claim 3 wherein said hydrogen flows from said first hydrogen inlet toward said second hydrogen inlet and from said second hydrogen inlet toward said first hydrogen inlet.

5. The pre-spiral bundle of claim 1 wherein at least one of said first and second hydrogen inlets comprises a hydrogen injection tube comprising sufficient rigidity to support said pre-spiral bundle wrapped spirally around said hydrogen injection tube.

6. The pre-spiral bundle of claim 2 wherein at least one of said first and second hydrogen inlets comprises a hydrogen injection tube comprising sufficient rigidity to support said pre-spiral bundle wrapped spirally around said hydrogen injection tube.

7. The fuel cell of claim 3 wherein said at least one of said first and second hydrogen inlets comprises a hydrogen injection tube comprising sufficient rigidity to support said spirally wrapped cylindrical fuel cell.

8. The fuel cell of claim 4 wherein at least one of said first and second hydrogen inlets comprises a hydrogen injection tube comprising sufficient rigidity to support said spirally wrapped cylindrical fuel cell.

9. The pre-spiral bundle of claim 1 wherein said anode is sandwiched between first and second layers comprising a catalytically effective amount of said noble metal catalyst.

10. The pre-spiral bundle of claim 2 wherein said anode is sandwiched between first and second layers comprising said a catalytically effective amount of said noble metal catalyst.

11. The fuel cell of claim 3 wherein said anode is sandwiched between first and second layers comprising said a catalytically effective amount of said noble metal catalyst.

12. The fuel cell of claim 4 wherein said anode is sandwiched between first and second layers comprising said a catalytically effective amount of said noble metal catalyst.

13. The pre-spiral bundle of claim 5 wherein said anode is sandwiched between first and second layers comprising a catalytically effective amount of said noble metal catalyst.

14. The pre-spiral bundle of claim 6 wherein said anode is sandwiched between first and second layers comprising a catalytically effective amount of said noble metal catalyst.

15. The fuel cell of claim 7 wherein said anode is sandwiched between first and second layers comprising a catalytically effective amount of said noble metal catalyst.

16. The fuel cell of claim 8 wherein said anode is sandwiched between first and second layers comprising a catalytically effective amount of said noble metal catalyst.

17. A cylindrical fuel cell comprising:
a pre-spiral bundle in ionic communication with a cathode, said pre-spiral bundle and said cathode being spirally wrapped around an axis to form a cylinder comprising a top and a bottom and retained by an electrically conductive casing;
an anode having first and second opposed edges and at least one surface in ionic communication with a first noble metal catalyst effective to produce an open circuit voltage of at least about 0.5 volts;
a first hydrogen inlet disposed along said first edge of said anode;
a second hydrogen inlet disposed along said second edge of said anode;
a sleeve comprising a proton exchange membrane having upper and lower substantially planar surfaces abutting and encapsulating said anode, said first hydrogen inlet, said second hydrogen inlet, and defining a hydrogen flow path along said anode and between the upper and lower surfaces of said sleeve; and
a cathode in fluid communication with a flowpath for a gas comprising oxygen and in ionic communication with said anode and a second noble metal catalyst;
wherein said sleeve and said cathode are spirally wrapped around a mandrel comprising one of said first and second hydrogen inlets.

18. The cylindrical fuel cell of claim 17 wherein said axis is selected from the group consisting of said first and second hydrogen inlets.

19. The cylindrical fuel cell of claim 18 wherein said axis comprises a hydrogen injection tube comprising sufficient rigidity to support said cylindrical fuel cell.

20. The fuel cell of claim 17 wherein said anode is sandwiched between first and second layers comprising said catalytically effective amount of said first noble metal catalyst.

21. The fuel cell of claim 19 wherein said anode is sandwiched between first and second layers comprising said catalytically effective amount of said first noble metal catalyst.

22. The pre-spiral bundle of claim 1 wherein said sleeve further comprises third and fourth edges, wherein at least one of said first, second, third and fourth edges is heat sealed.

23. The fuel cell of claim 2 wherein said sleeve further comprises third and fourth edges, wherein at least one of said first, second, third and fourth edges is heat sealed.

24. The pre-spiral bundle of claim 5 wherein said sleeve further comprises third and fourth edges, wherein at least one of said first, second, third and fourth edges is heat sealed.

25. The fuel cell of claim 17 wherein said sleeve further comprises third and fourth edges, wherein at least one of said first, second, third and fourth edges is heat sealed.

* * * * *

UNITED STATES PATENT AND TRADEMARK OFFICE
CERTIFICATE OF CORRECTION

PATENT NO. : 6,063,517
DATED : May 16, 2000
INVENTOR(S) : Montemayor et al.

It is certified that error appears in the above-identified patent and that said Letters Patent is hereby corrected as shown below:

Please correct the claims as follows:

Column 6, line 14, delete "gears" and insert --gear--

Column 7, line 5, delete "adjustable" and insert --adjustably--

Signed and Sealed this

Twenty-fourth Day of April, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,063,517
DATED : May 16, 2000
INVENTOR(S) : Alan Montemayor, et al.

It is certified that error appears in the above-identified patent and that said Letters Patent is hereby corrected as shown below:

Column 7,
Line 14, please delete the first occurrence of "said".
Line 17, please delete "said".
Line 20, please delete "said".

Signed and Sealed this

Twenty-seventh Day of July, 2004

JON W. DUDAS
*Acting Director of the United States Patent and Trademark Office*